(12) United States Patent
Ristau et al.

(10) Patent No.: US 6,374,307 B1
(45) Date of Patent: Apr. 16, 2002

(54) NON-INTRUSIVE DWDM BILLING SYSTEM

(76) Inventors: Steve A. Ristau, 1581 Hallbrook, San Jose, CA (US) 95118; Richard Brewster Main, 23777 Mines Rd., Livermore, CA (US) 94550

( * ) Notice: Subject to any disclaimer, the term of this patent is extended or adjusted under 35 U.S.C. 154(b) by 0 days.

(21) Appl. No.: 09/249,008

(22) Filed: Feb. 12, 1999

(51) Int. Cl.[7] .................... G06F 15/16; G06F 15/177
(52) U.S. Cl. .................. 709/249; 709/224; 359/128; 379/114.01
(58) Field of Search .................... 709/224, 249; 359/124, 127, 128; 379/111, 112.01, 114.01, 114.03, 114.07, 114.08, 115.01, 133, 134, 137; 705/400, 401, 412

(56) References Cited

U.S. PATENT DOCUMENTS

| | | | | |
|---|---|---|---|---|
| 5,623,405 A | * | 4/1997 | Isono | 379/114.01 |
| 5,970,477 A | * | 10/1999 | Roden et al. | 709/229 |
| 6,212,506 B1 | * | 4/2001 | Shah et al. | 705/400 |
| 6,230,203 B1 | * | 5/2001 | Koperda et al. | 709/229 |

OTHER PUBLICATIONS

Bourne, J.; "Fiber to the home; practically a reality"; Jun. 1988; Communications, 1988; INSPEC Accession No. 3296166.*
Ahrens, M. J.; "Next generation switching operations: a fiber center perspective"; Nov. 1989; Global Telecommunications Conference and Exhibition; INSPEC Accession No.: 3719165.*
Rockwell, Mark; "Ciena shines light on WDM"; Jul. 22, 1996; CommunicationsWeek, CMP Publications.*

* cited by examiner

*Primary Examiner*—Mark H. Rinehart
*Assistant Examiner*—Marc D. Thompson

(57) ABSTRACT

A billing system comprises an optical system that uses a variable magnification mirror to split-off a sample of the DWDM-carrier through traffic. A pair of wedge-filters are alternatively included to add/drop particular carriers according to their respective wavelengths. The selected carrier sample is then processed through a CISCO 12000 gigabit switch router such that billing information is output that is useful to an optical Internet backbone carrier.

10 Claims, 4 Drawing Sheets

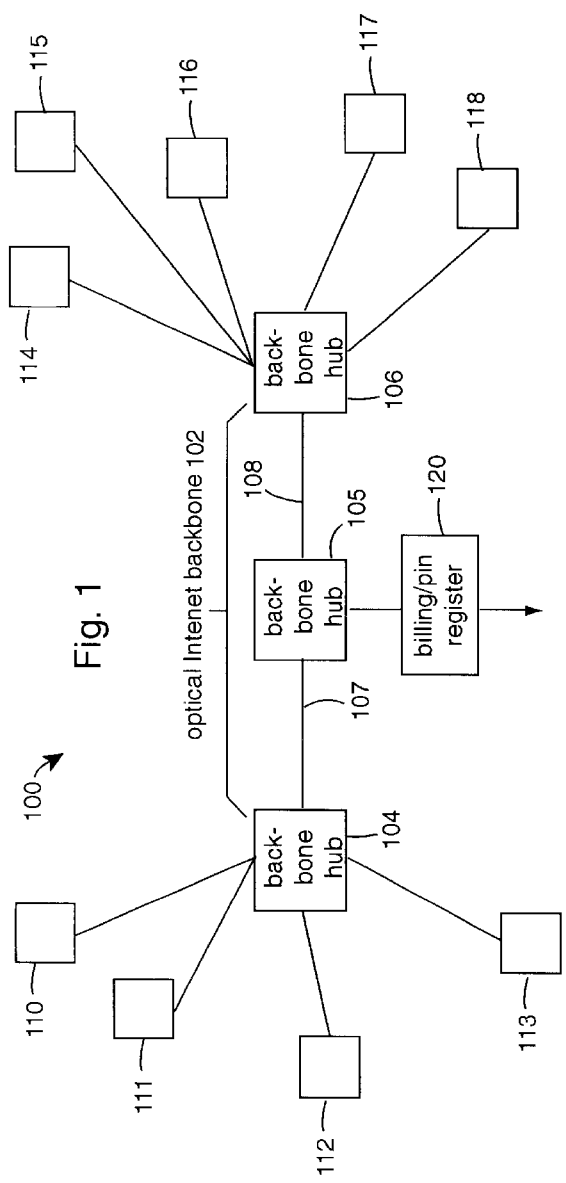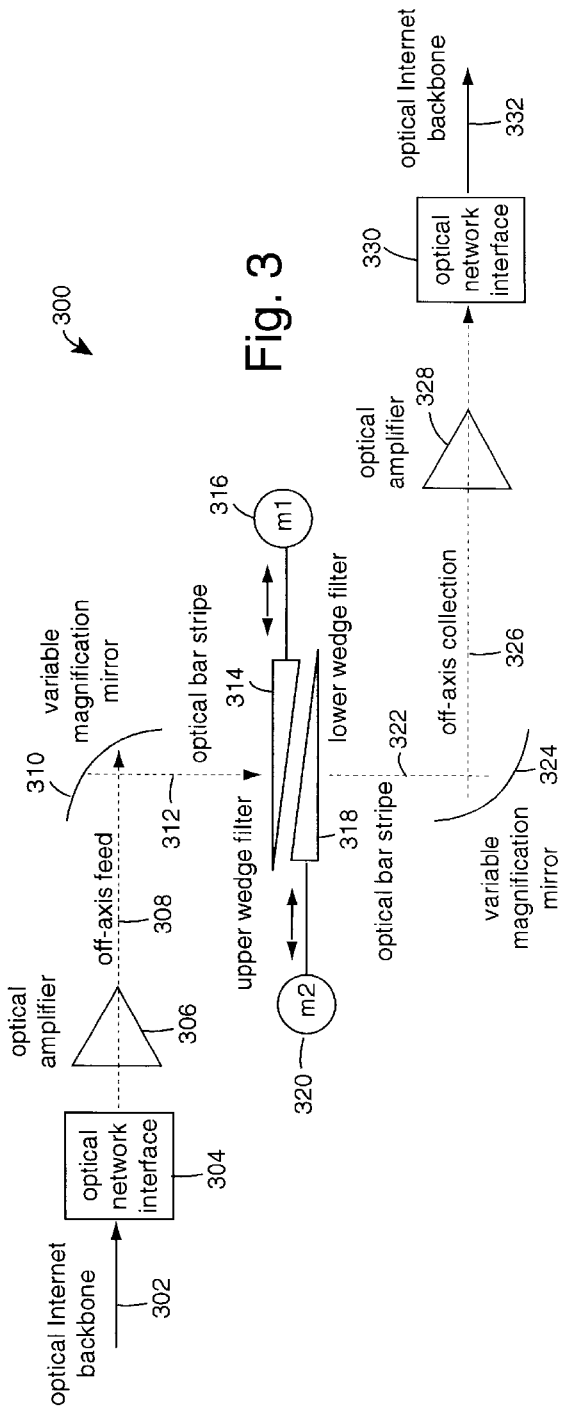

NON-INTRUSIVE DWDM BILLING SYSTEM

FIELD OF THE INVENTION

The present invention relates to Internet network carrier billing devices, and more particularly to billing methods and systems that can operate at the extreme speeds and volumes provided by dense wave-division multiplexing optical backbones.

DESCRIPTION OF RELATED ART

Up until very recently, data traffic volumes were relatively small compared to voice. In 1995, the highest-speed Internet backbone links operated at speeds of 155 million bits-per-second (Mbps). Even in 1997, the highest speed was 622 Mbps. Backbone link speeds for other data services, e.g., Frame Relay, have typically been less. To make more efficient use of optical fiber data capacities, time-division multiplexing (TDM) has been used that combines the Internet backbones with voice-call trunks. However, the increased carrier speeds have created a dilemma in designing billing devices that don't become network bottlenecks.

The current voice-communication infrastructure is a TDM and circuit-switching network for 64-kbps voice circuits. Such TDM part of the network includes digital cross-connects and synchronous optical network/synchronous digital hierarchy (SONET/SDH) network elements. Thousands of voice circuits are combined by a multiplexer to fully utilize the high-speed fiber optic transmission facilities. Currently, such optical fibers typically operate at 155 Mbps to 2.5 gigabits-per-second (Gbps). The higher 2.5 Gbps is more prevalent on long-haul backbone facilities and interoffice or metro areas. New OC-192/STM-64 systems operating at 10.0 Gbps are just now being deployed.

Both long-haul and short-haul computer networks are beginning to see the wide-scale deployment of OC-48 dense wave-division multiplexing (DWDM). Cisco Systems (San Jose, Calif.) has begun building its switches and routers to interface directly to WDM equipment to take advantage of WDM and the emerging optical network layer. Wave-division multiplexing (WDM) technology has emerged as a practical way to increase the capacity of optical fiber. WDM systems carry multiple channels of information, each operating at up to 2.5 Gbps, or even 10.0 Gbps, by using different wavelengths in the infrared light spectrum (near 1550 nm). To date, WDM systems have been designed primarily for point-to-point connectivity over long distances and have been widely deployed by interexchange carriers in the U.S. and other long-haul applications. New WDM systems are now appearing that are optimized for interoffice or metropolitan applications and that support more flexible topologies. Continuing advances in optical technologies are giving rise to an optical network layer that will be capable of routing wavelengths over complex networks and providing "lightpaths" to client layers above.

First-generation WDM systems supported only four to sixteen wavelengths, each operating at 2.5 Gbps. Second-generation systems now being deployed support thirty-two to forty wavelengths, and products have been promised that will support as many as one hundred wavelengths. Experimental systems have already demonstrated as much as one terabit (100 10-Gbps channels) transmitted on a single fiber. TDM rates are not keeping pace with data traffic growth. Only data devices that can access the enormous capacities made possible by WDM will be capable of meeting this demand.

High-speed switch and router interfaces are needed that provide cost-effective interconnection with optical network elements and that are able to efficiently use the capacity provided by each WDM wavelength, e.g., big fat pipes (BFPs). The OC-48 c (2.5-Gbps) interface for Cisco's 12000 gigabit switch router has an OC-48 c clear channel interface delivered on a data platform. Such allows for the most efficient transport of data for backbone applications, providing significant bandwidth gain through statistical multiplexing compared with the OC-12 solutions currently delivered via TDM. BFPs significantly reduce the complexity and management of the network by eliminating the need for TDM capabilities in the backbone hierarchy of the transport infrastructure. Higher-speed BFPs will be delivered in the future to take advantage of increases in WDM channel capacities and densities.

Wide-area computer data traffic continues to expand exponentially. In response, we are seeing the emergence of the optical Internet, a new data-optimized service infrastructure that will become the foundation for these data services. High-speed internetworking devices and optical networking technologies will provide this foundation. Connecting internetworking devices directly with optical technologies will enable service providers to deliver data services at dramatically reduced costs. By directing capital expenditures toward a data-optimized infrastructure rather than a legacy voice/circuit switched infrastructure, service providers can ensure their competitiveness in the new network landscape beyond the year 2000.

There appears to be no end to the explosive growth of data traffic. The Web-driven growth trends of recent years will be followed by successive waves of demand resulting from voice over IP/ATm/Frame Relay, video, and high-speed subscriber access via digital subscriber lines and cable. The adoption of intranets and extranets for networked commerce will bring further changes to the IP-service infrastructure, both through bandwidth demands and feature requirements. Service providers know that their future lies in data, which is expected to account for the majority of the traffic volume on the networks and bring most of the lucrative new service opportunities in the coming years. According to one industry analyst, in the future, eighty percent of service providers' profits will be derived from data services.

Profitability for service providers depends on increasing service revenue and decreasing delivery costs. The revenue side of this equation depends on the ability to move up the value chain and deliver value-added services that are attractive to businesses and consumers. The Cisco IOS® software provides the foundation for the delivery of high value-added, end-to-end services that can be delivered over a broad set of technologies.

The total investment in the public service infrastructure today in North America alone is estimated at roughly one quarter of a trillion dollars. This investment has primarily been made to address the requirements of voice services, which in North America represent about $150 billion annually.

While investments in voice/TDM infrastructure are enormous, intense competition in the voice market brought about by deregulation has led most observers to expect low margins on voice traffic in the coming years. This fact combined with enormous opportunities in data creates a strong motivation to limit future expenditures in legacy voice/TDM equipment and focus investments in the data arena. The role of SONET/SDH in the future remains important as the transition from TDM to optical internetworking takes place. Important key aspects such as performance management, fault isolation, and protection will need to be carried forward into the optical internet architecture.

While data traffic volumes are still relatively small compared to voice, they are increasing dramatically. Leading Internet providers report bandwidths doubling on their backbones approximately every six to nine months. In 1998, the largest Internet backbone providers will deploy 2.5-Gbp links between routers. Data volumes are now capable of consuming entire optical fibers operating at the prevalent speed of 2.5 Gbps. It is therefore neither necessary, nor possible, to continue using SONET/SDH equipment to multiplex high-speed data links with other traffic. In optical internets, high-performance internetworking devices (switches and routers) are interconnected via optical networking technologies. They may be directly connected with optical fiber, or they may be connected to an optical network layer that provides wavelength routing for various clients including internetworking devices and SONET/SDH network elements. In either case, the switches or routers use the full capacity provided by the fiber or wavelengths to statistically multiplex packets or cells, allowing efficient use of data capacity.

Optical internetworking eliminates the need for a TDM hierarchy for data services, replacing it with the statistical multiplexing of packets/cells and enabling other SONET/SDH functions to be moved into the data equipment. Equipment costs are reduced, because separate SONET/SDH devices for TDM multiplexing are no longer required between the switching/routing and optical layers. The network is generally simplified by a reduction in the number of separate physical devices. Finally, the network is freed from the speed and capacity limitations of TDM and its DS0-based hierarchy.

These elements will be delivered through a strategy that leads from today's SONET/SDH infrastructure ultimately to extend the optical internetworking model all the way to the customer premise. Optical internetworking strategy is provided by scalable and reliable data platforms with the capacity to exploit the bandwidths available at the optical layer. Cisco has delivered SONET/SDH-compatible optical interfaces on a range of switching and routing platforms. They pioneered Packet-over-SONET/SDH (POS) technology for the delivery of IP services directly over SONET/SDH circuits.

The 1997 acquisition of Skystone Systems in Ottawa, Canada, provided Cisco with core competencies and a center of excellence for SONET/SDH-based management and low-cost, data-oriented optical solutions, as well as high-speed SONET/SDH networking.

The integration of optical networking capabilities within switches and routers will enable switches and routers to interface directly to fiber in situations where additional optical network layer elements are not required or justified. This includes long-reach optics and other products that extend the distances over which switches and routers can be interconnected.

Early efforts focused primarily on the network backbone where data volumes already demanded optical capacities. Future efforts need to extend a similar architecture to inter-office and metropolitan parts of the network. As data volumes increase, and the cost of optical technologies decrease, optical internetworking will become the preferred architecture. Data-optimized ring solutions that do not need the fine granularity of TDM will be used to maximize the bandwidth efficiency. This while still providing the same levels of performance monitoring, restoration, and reliability seen in SONET/SDH-based ring architectures.

Routers and switches will be pushed farther out into the edge points of the network, creating a much more distributed and more scalable set of intelligent network elements, compared to the current TDM infrastructure. A significant amount of the metropolitan data traffic is now being backhauled with TDM to a small number of data-oriented points of presence (POP's). The net result of such change will be to dramatically reduce the overall complexity and simplify management of metropolitan-based networks. Creating an all-optical internet from central office through the interexchange network to another central office without the need for legacy TDM capabilities.

With an optical internetworking fabric in place all the way to the central office, the next step will be to provide optical internetworking solutions all the way to the customer premise. At this point, there will no need for TDM within the data network, and the common access speed will not be DS0, T1/E1, or T3/E3, but instead, a data-oriented interface such as ETHERNET. These solutions will take the form of low-cost CPE devices with optical integration with LAN interfaces facing the customer. Further integrated into this solution will be other access technologies such as xDSL or data over cable for last-mile delivery where fiber to the premise/or home is not possible or required.

With the solutions outlined above, we will be able to offer service providers the ability to provide ETHERNET bandwidth (10 Mbps) capability to their customers at the equivalent cost of providing POTS (64 K) services today.

The optical network layer itself is relatively new. In the next few years, optical add/drop multiplexers, optical cross-connects, and other types of network elements will become commonplace. The ITU and other standards bodies are actively defining the standards that will ensure interoperability within the optical network layer.

Optical internetworking also raises many issues and will require standardization to avoid a proliferation of vendor-specific approaches, particularly between the switching and optical layers. But given the pressing need for IP capacity, deployment is likely to proceed rapidly. Some of the issues that require attention include optical interfaces. As data equipment requires ever-increasing amounts of bandwidth from the optical layer, new optical interfaces will be required. While SONET/SDH-derived optics can meet this need today, multiple wavelengths will ultimately be needed, requiring the specification of a multichannel interface between data and optical layers. Data equipment will need to support more sophisticated optical topologies including meshes and rings. Fast restoration mechanisms are required to provide the resilience available from SONET/SDH today. Data Optimized Add/Drop Multiplexers will be required and should be designed to take advantage of cost reduction possible with a data-oriented architecture.

Cisco and Ciena have joined with other industry leaders AT&T, Bellcore, Hewlett-Packard, Qwest, Sprint, and WorldCom to found the Optical Internetworking Forum (OIF). The mission of the OIF is to accelerate the development and deployment of optical internetworking products by fostering industry cooperation and adoption of open specifications. The OIF is not intended to assume the role of national or international standards bodies such as the ITU, ANSI, or IETF, which are already working to standardize the optical internetworking layers. By focusing on key specifications of importance to the rapid deployment of data-oriented optical networks, the OIF will seek to build industry consensus and provide valuable input to the formal standards process.

Internet service providers must find new sources of revenue beyond those generated by flat rate billing to remain competitive. How their customers use new services and network resources needs to be accurately tracked and billed. Hewlett-Packard and Cisco Systems recently announced the INTERNET USAGE BILLING SOLUTION, which is based on an HP/Cisco "Internet Usage Platform". Internet service providers (ISPs) and telecommunications service providers can thereby offer new IP services to their enterprise customers. The Internet Usage Billing Solution is an integrated bundle that includes the HP/Cisco Internet Usage Platform, Portal Software's billing application Infranet®, system integration services from HP's Professional Services Organization, and billing solution integration services from Cap Gemini Telecom & Media.

The HP/Cisco Internet Usage Platform extracts accounting information from strategic points in an IP environment. Cisco NetFlow technology at the router identifies IP packet flows, performs efficient statistics collection, accelerates security filtering, and exports the statistics to downstream collectors. NetFlow provides fine-grained metering for ISPs to bill usage by time, traffic volume, application, source, and destination.

HP's Smart Internet Usage (SIU) enables accurate aggregation, in near-real time, of customer traffic statistics. Such data is correlated to the critical resources and services used, e.g., IP services, access services, and systems. Information is summarized in an open and extensible format called the Internet data record (IDR), for billing, marketing, and capacity planning applications. The Internet Usage Billing Solution automatically feeds this information to the integrated Portal Infranet rating and billing application.

Portal Software is scalable and adaptable customer management and billing software for ISP's. Portal's Infranet software helps to register, manage, and bill individual customers. Infranet is integrated into the Internet Usage Billing Solution, and uses data in the IDR's. Optical add/drop multiplexers (OADM's) promise to be a key for a variety of broadband areas, including Internet access, Web hosting and cable television (CATV). Ericsson Network Systems recently announced its Flexing Bus OADM at the National Fiber Optic Engineers Conference (NFOEC) in Orlando. Flexing Bus is a 32-channel ring architecture which was initially released in a 16-channel version. Fujitsu Network Communications, Inc., showed a dynamic, 256-x-256 wavelength-reconfigurable OADM based on acousto-optic tunable filtering (AOTF) at Supercomm '1998 in Atlanta. Fujitsu's unit is a fixed 32 Gbps×10 Gbps unit included the vendor's Metro family of products. Siemens Telecom Networks had an OADM it showed as one of several network elements in a high-capacity wave division multiplexing (WDM) system at NFOEC. The TransXpress Infinity OADM is "mostly optical", and is a 32-channel×10 Gbps unit with a reach of 600 km. Alcatel markets its 1680-OGM (Optical Gateway Manager), a smaller version of the 1680-OGX (Optical Gateway Cross-connect). The Alcatel 1680-OGM manages the entry points into the backbone optical layer, and works in tandem with the Alcatel 1680-OGX that manages transitions between interconnected optical layer networks. The OGM is placed at intermediate locations between OGX cross-connects for terminating optical layer services, aggregating a mixture of cell-based and synchronous transfer mode (STM)-based services. The OGM can sit across five to ten OC-192 (10 Gbps) rings and provide connectivity to all, while the larger OGX provides connectivity of ten to three hundred rings. The next step is the 1640-OADM, which will provide OADM capacity. The 1640-OADM reportedly will be available within the next twelve months.

NEC America offers an OADM with remote provisioning capability. The programmable OADM can look at any wavelength in a 32- or 64-wavelength environment, and remotely select whether to add or drop a wavelength. The add/drop functionality of NEC's SpectralWave line will allow all in-line amplifiers in a given WDM section to be upgraded to OADM. The existing in-line amp remains in place, serving as a pre-amp for the OADM. The output of the in-line amp, which was once directed to the next optical path, is now directed to the input of the OADM shelf. This OADM implementation allows the signals to be remotely provisioned using the system's operations support system (OSS) interfaces. Any of thirty-two wavelengths can be dropped, although the system is limited to eight channels added and/or dropped. OADM ring functionality is planned, according to NEC.

SUMMARY OF THE INVENTION

It is therefore an object of the present invention to provide an all-optical method of extracting billing from an optical backbone without creating a network bottleneck.

It is another object of the present invention to provide a network monitor PIN-register collection of IP-packet source-destination linkage information for billing and other management purposes.

Briefly, a billing system embodiment of the present invention comprises an optical system that uses a variable magnification mirror to split-off a sample of the DWDM-carrier through traffic. This sample is then processed through a CISCO 12000 gigabit switch router such that billing information is output that is useful to an optical Internet backbone carrier.

An advantage of the present invention is that the billing function can run in a realtime OC-48 DWDM optical backbone and yet not create a network bottleneck.

Another advantage of the present invention is that a TCP/IP pin-register is provided that can be used by law enforcement agencies to detect and track criminal activities and syndicates that are using the Internet.

More advantages will become apparent to those of ordinary skill in the art upon further review of the following description and illustrated drawings contained herein.

IN THE DRAWINGS

FIG. 1 is a functional block diagram of an optical Internet backbone network communication system embodiment of the present invention;

FIG. 3 is a functional block diagram of an optical add/drop multiplexer embodiment of the present invention;

DETAILED DESCRIPTION OF THE PREFERRED EMBODIMENT

Figure 2:
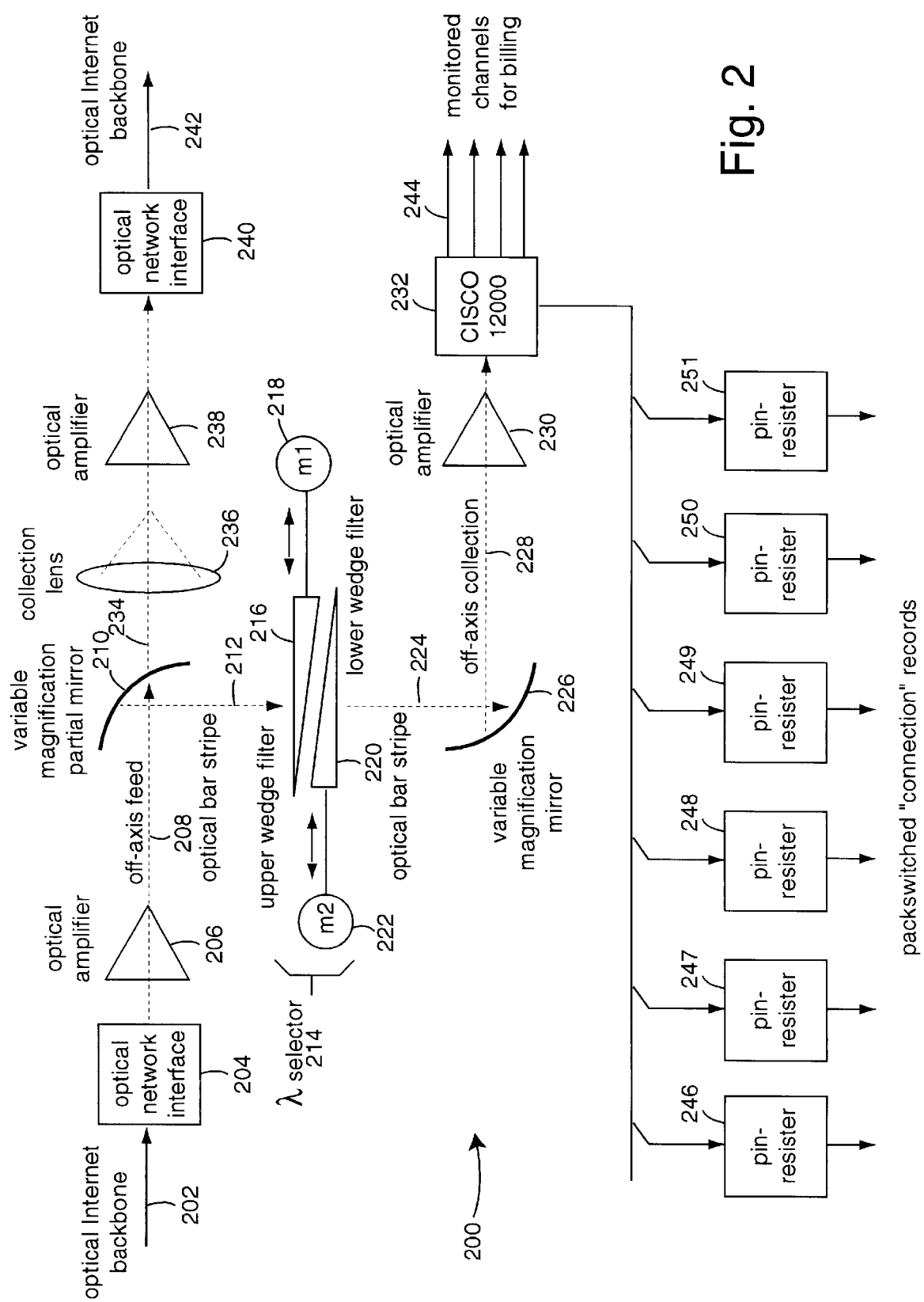
FIG. 2 is a functional block diagram of an all-optical billing tap embodiment of the present invention.

FIG. 1 illustrates a optical Internet backbone network communication system embodiment of the present invention, and is referred to herein by the general reference numeral 100. The Internet system 100 includes an optical backbone 102 that is capable of very high transmission rates, e.g., OC-192 (10.0 Gbps), and that uses dense wavelength division multiplexing (DWDM). For example, Sprint uses a combination of OC-48 (2.5 Gbps) and OC-192 (10 Gbps) over wave division multiplexing (WDM) for its carrier system. Even still higher levels of performance can be expected in the near future from Level3 and Qwest. Combinations of OC-192 (10 Gbps) and OC-768 (40 Gbps) will most probably appear soon once the technological hurdles are overcome.

The system 100 includes all-optical hubs and repeaters 104–106 connected by fiberoptic cables 107 and 108. Conventional 10.0 Gbps systems can transmit signals four hundred to six hundred kilometers before needing to be opto-regenerated on long-haul circuits. Higher speed future systems will also need to have this much "reach" to enjoy wide-scale deployment. Although several manufacturers are bringing new fiber products to market, the standard single-mode fiber is deployed in more than ninety percent of the installed base, and it will be awhile before that fiber can be changed out. WDM will be used first to fend off fiber-capacity exhaustion, because WDM allows use of existing fibers. Current DWDM products are now capable of delivering thirty-two channels at 10.0 Gbps, but require better quality fiberoptic cables to control optical carrier degeneration better.

FIG. 1 includes a number of network nodes 110–118 that represent Internet Service Providers (ISPs), business and individual subscribers, and other Internet users who intercommunicate with one another. The system 100 allows a long-haul carrier, such as Level3 or Qwest, to bill for "connections" that are "established" over the backbone 102. The communication traffic is, in fact, TCP/IP packet-switched information that is routed according to destination-address information included in every datapacket. Such datapackets also include source-address information. These source and destination addresses are coded in the form of IP-addresses.

A billing/pin register 120 is connected to a tap at the backbone hub 105 and is used to generate lists of packet connection information. The datapacket content is not recorded, only the source and destination IP-addresses from each is recorded. The time-of-passage of the recorded datapacket through the backbone hub 105 may also be recorded. It is critical to the present invention that the billing/pin register 120 not interfere with the throughput of the optical carriers on the backbone 102. The traffic passing through the backbone hub 105 is merely tapped-off optically, and is not forced through an optical-to-electronic and an electronic-to-optical set of conversions. The billing/pin register 120 preferably includes a Cisco "12000" gigabit switch router (GSR) which has an OC-48 c (2.5-Gbps) interface. Cisco 12000 GSR line cards are designed for the transmission of IP-packets or ATM cells over SONET-based optical interfaces at wire speed and are exchangeable across all GSR models. Each of these line cards is available for single-mode and multi-mode optics. The GSR is based on a high-speed distributed routing architecture combined with a state-of-the-art switching core that delivers traditional Layer-3 routing services at gigabit speeds. At the heart of the GSR is a multi-gigabit crossbar switching fabric that provides synchronized gigabit-speed interconnections for all the other cards in the system. This distributed architecture provides scalable switching capacity ranging from ten Gbps to sixty Gbps, switching fabric efficiency of ninety-nine percent and eliminating HOLB through a scheduling algorithm combined with virtual output queues, and wire-speed support for Layer-3 multicast traffic through micro-programmable application-specific integrated circuits (ASIC's)-based queuing. A modular, multigigabit crossbar switching fabric allows bandwidth to scale as backbone requirements grow from ten Gbps to sixty Gbps. The distributed architecture allows for a scalable Layer-3 switching performance through intelligent line cards that can be added-in as backbone requirements grow. Line-rate forwarding is used to fill SONET/SDH transmission pipes to capacity.

The source-destination information collected by system 100 can then be used by communication company billing departments or law-enforcement agencies to sort out who is communicating to who, how much, and exactly when. Certain IP-address spaces will fall within the responsibility of particular ISPs, for example, and the collected information can be used to generate subscriber billing statements. Law enforcement can, with a proper Court warrant, gather and use the information related to particular IP-addresses to track and analyze criminal activity, especially organized crime that has taken to the new frontiers of the Internet.

FIG. 2 illustrates an all-optical billing tap 200, and is similar to that included in system 100 of FIG. 1. An optical Internet backbone 202 connects to an optical network interface 204 and an optical amplifier 206. An off-axis optical feed 208, e.g., including DWDM optical carriers, is directed to a variable-magnification partial-mirror 210. A portion of the off-axis optical feed 208 is reflected down in an bar-stripe beam 212. The variable-magnification partial-mirror 210 transforms the circular point of light in the off-axis optical feed 208 into a line of light focused on an upper optical wedge filter 216.

The theory, construction, and use of variable-magnification mirrors is described by Robert W. Windebank and Richard G. Tuck in U.S. Pat. No. 5,096,281, issued Mar. 17, 1992, and incorporated herein by reference.

The upper optical wedge filter 216 is driven by a first motor (m1) 218 so that different edge thicknesses are presented to the incident beam 212. Such edge thickness determines which wavelengths of light will pass and which will not pass through the wedge filter. The upper optical wedge filter 216 will behave as a low-pass color filter or a high-pass color filter, depending on its construction and its relative position control by m1 218. A lower optical wedge filter 220 is driven by a second motor (m2) 222 so that different edge thicknesses are presented to the incident beam 212 after passing through the upper optical wedge filter 216. The combination of the upper and lower optical wedge filters 216 and 220 will act as a color bandpass, wherein the upper and lower extremes of light wavelengths bandpassed are controlled by motors 218 and 222.

The theory, construction, and use of a wedge-filter spectrometer is described in U.S. Pat. No. 4,957,371, issued Sep. 18, 1990, by Samuel F. Pellicori. Wedge imaging spectrometers have been suggested for orbiting multispectral and hyperspectral acquisition systems, e.g., by George T. Elerding, et al., in "Wedge Imaging Spectrometer: Application to drug and pollution law enforcement", SPIE Vol. 1479, Surveillance Technologies (1991). This work at Hughes Aircraft Company (Goleta, Calif.) credits the Santa Barbara Research Center (SBRC) and describes a sensor that is rugged and compact. To avoid the need for complex and delicate filter optics, a wedge filter is attached to an area array of detectors for two-dimensional sampling of the combined spatial/spectral information passed by the filter. The use of a continuous variable optical filter permanently aligned with a spectrometer sensor array in air-borne ground survey application is described by N. Gat, in U.S. Pat. No.

5,166,755, issued Nov. 24, 1992, and incorporated herein by reference. A spatially tunable rugate narrow reflection band filters is described by Thomas D. Rahmlow, in U.S. Pat. No. 5,432,638, issued Jul. 11, 1995. Haruhito Shimizu, also describes a variable wavelength filter in U.S. Pat. No. 5,684,623, issued Nov. 4, 1997. All such Patents mentioned herein are incorporated herein by reference.

A typical wedge filter has a transparent substrate on which several thin-film depositions are made with a taper in thickness along the y-axis of the plane of the substrate and no taper along the x-axis. The depositions result in light passband preferences that vary, e.g., from 400–1030 nanometers, in the wavelengths of light along the y-axis of the substrate plane that are allowed to pass according to the thickness of the thin-film depositions for each x-axis row.

An optical bar-stripe beam 224 leaves the wedge filters that is the filtered product of beam 212. A variable magnification mirror 226 is needed to transform the bar-stripe objective back into an off-axis collection beam 228 that accommodates the numerical aperture of an optical amplifier 230. A Cisco 12000 gigabit switch router 232 receives a sample carrier for processing.

An optical carrier 234 that passes through the partial mirror 210 is collected and collimated to accommodate the numerical aperture of an optical amplifier 238. An optical network interface 240, e.g., one for OC-48, OC-192, or OC-768, is used to couple the carrier back to a continuation of the optical backbone 242.

The Cisco 12000 gigabit switch router 232 processes the selected sample carrier 228 and is used to feed several billing channels 244 and pin-registers 246–251. Conventional billing software can be used. The pin-registers are the direct equivalent of those that local telephone companies use to log the calls and callers of particular subscribers.

Optical fiber manufacturing technology is now over forty years old. Today's fibers are stronger, more efficient, less costly and are able to transmit more wavelengths at much greater distance than those of the 1960's and 1970's. However, the basic operating principles have remain unchanged. There are two basic types of optical fibers, with the exception of some types of communication fiber. The center core carries light and is a glass with a relatively higher index of refraction. A thin clad layer of glass with a relatively lower index of refraction is fused around the core to create a reflecting interface at the junction of the two types of glasses. Typical glass fibers range 0.001–0.003 inches in diameter, with the core comprising eighty-three percent of the diameter area, and the clad comprising the remaining seventeen percent.

A typical fiberoptic cable has an outside clad sheath of glass with a refractive index different than the refractive index of the glass core, e.g., refractive indices of N1 and N2. The N1-N2 refractive interface of these two glass materials will reflect light if the incident light is aimed at less than a critical angle. However, if the angle is too great, the light will not reflect and just pass through. The sine of the critical angle is the numerical aperture (NA), and may be calculated as: $NA=\sqrt{(N_1)^2-(N_2)^2}$. So light sources need to be carefully coupled to fiberoptic cables so that a large percentage of the energy can be coupled in. It is the function of the variable magnification mirrors 210 and 226 to transform the light carriers so that they have suitable incident angles given the NA of the fiberoptic cables that they are associated with.

For example, given 1.62 for N1 and 1.52 for N2, a common glass combination, the NA is 0.56. This corresponds to a critical angle of thirty-four degrees. The fiber accepts light up to thirty-four degrees off axis in any direction, the acceptance angle of the fiber is twice the critical angle, or in this case, sixty-eight degrees. The "f/" number equivalent of the NA is calculated as the inverse of two times the NA. So an NA of 0.56 equals an f/0.89.

FIG. 3 illustrates an optical add/drop multiplexer (OADM) 300 that may be used in the devices of FIGS. 1 and 2. Here, the DWDM carriers that exist on an optical backbone 302 are received by an interface 304 and increased in magnitude by an optical amplifier 306. A beam 308 is fed off-axis to a variable magnification mirror 310 to be projected in a bar-stripe beam 312. An objective image of a line segment may be deliberately configured to skew across a range of thicknesses of a wedge-filter 314 driven by a motor 316. A second wedge-filter 318 can be askew in the horizontal plane parallel to the wedge-filter 314 and is driven by its corresponding motor 320. Some of the carrier wavelengths in the DWDM carrier will be stripped, blocked, or reflected and will be absent from a beam 322 as a result of the positions of motors 316 and 320. A variable magnification mirror 324 provides an off-axis projection beam 326 that suits the numerical aperture of an optical amplifier 328. A network interface 330 reconnects to an optical backbone 332.

Figure 4:
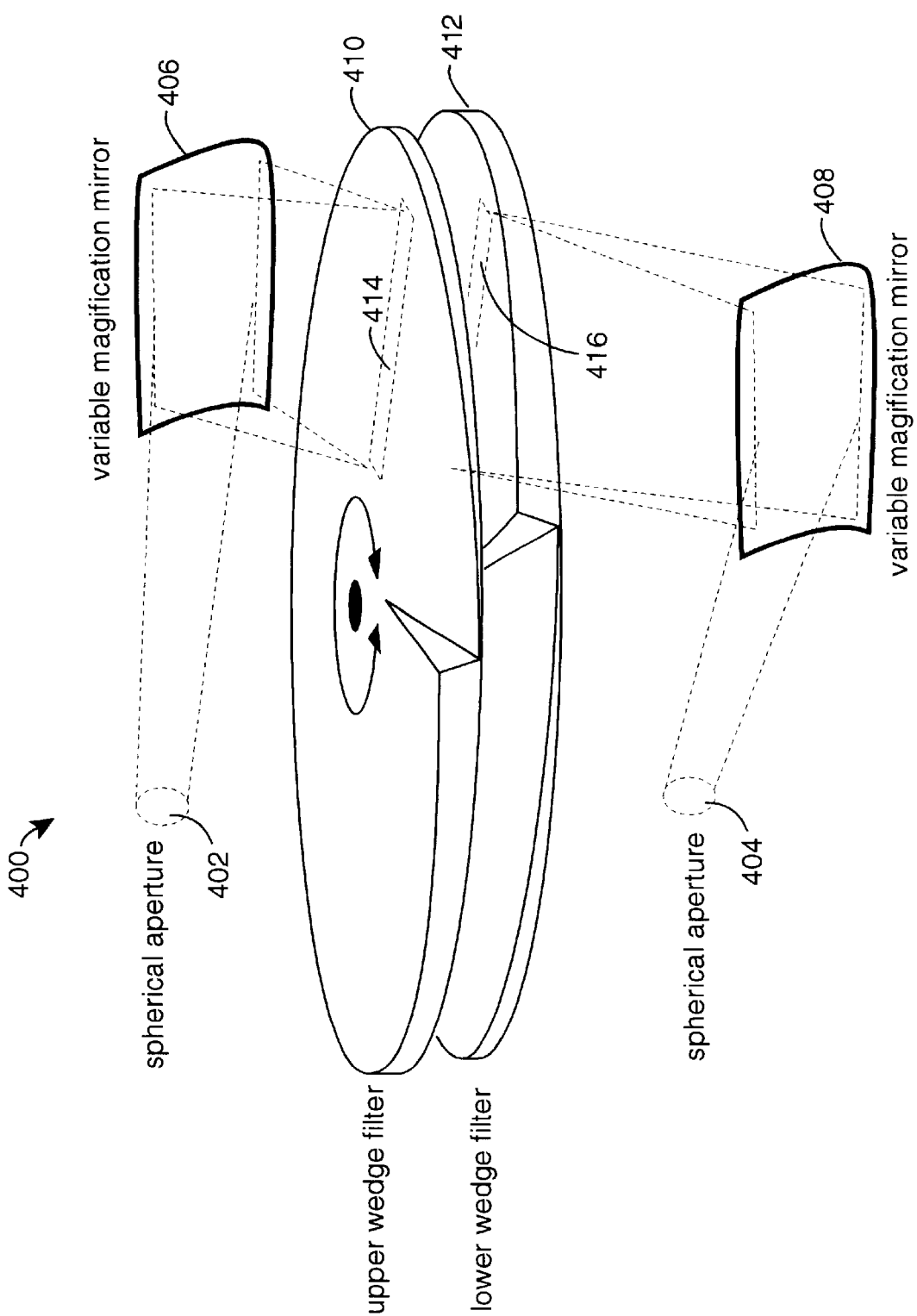
FIG. 4 is a view of the wedge filters of FIGS. 2 and 3 shown as parallel circular disks that are rotated on coaxial spindles of the present invention.

In FIG. 4, the wedge filters of FIGS. 2 and 3 are shown as parallel circular disks that are rotated on coaxial spindles. A filter system 400 has entry and exit spherical apertures 402 and 404 that communicate with a pair of matching variable magnification mirrors 406 and 408. An upper circular disk wedge filter 410 is coaxially mounted over a lower circular disk wedge filter 412. The mirrors 406 and 408 mutually communicate through the filters 410 and 412 through a pair of illuminated segments 414 and 416. The filter system 400 may be used in a DWDM OC-48 network environment to do tunable sampling, add/drop, maintenance, and network management function.

Figure 5:
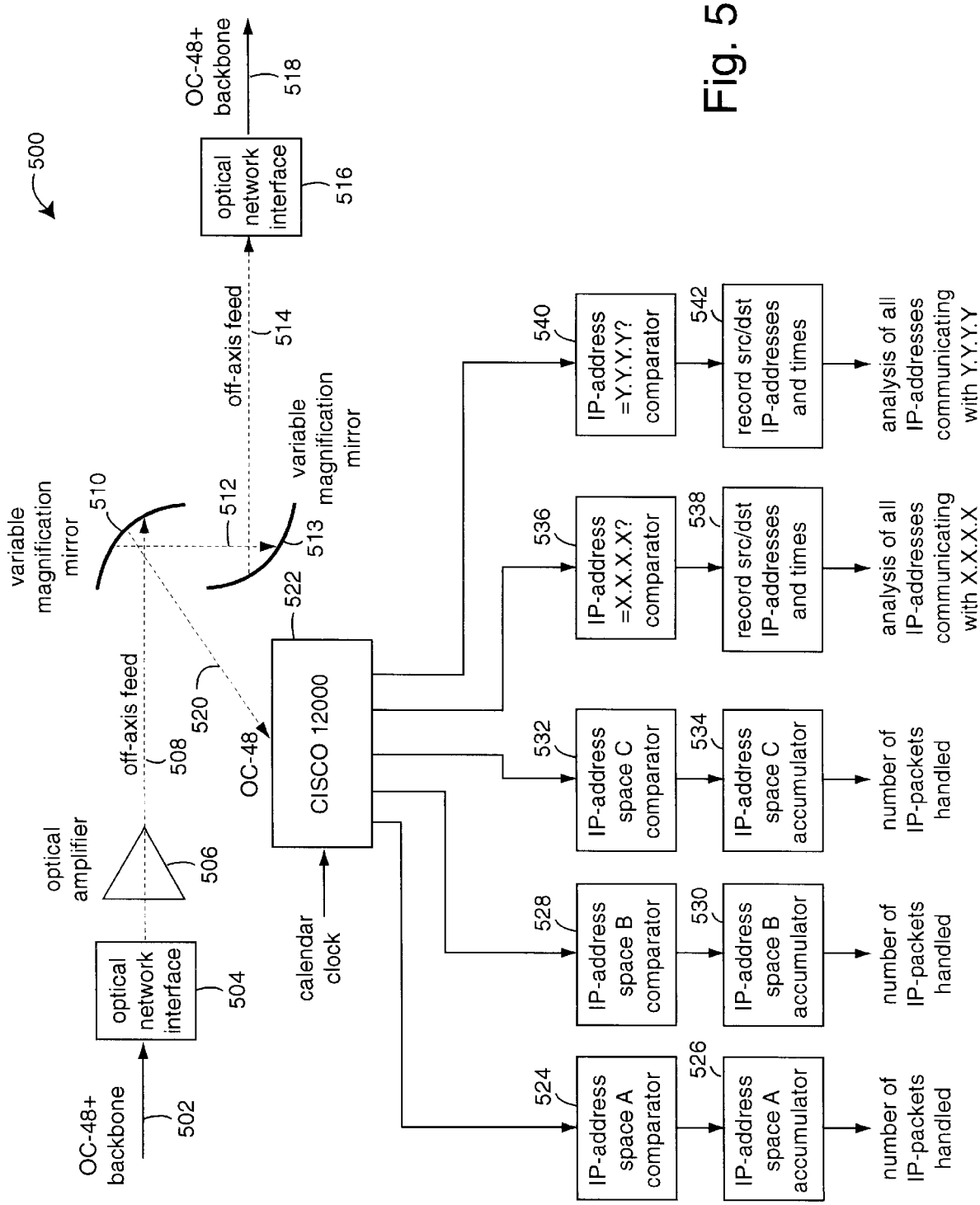
FIG. 5 illustrates an optical backbone billing system embodiment of the present invention.

FIG. 5 illustrates an optical backbone billing system embodiment of the present invention referred to herein by the general reference numeral 500. The system 500 accepts an optical network input 502, for example an OC-48 or higher speed, at an interface 504. The received DWDM signals are boosted in power by an amplifier 506 and directed in an off-axis feed 508 to a variable magnification mirror 510. Such mirror can be motor-positioned and is constructed to produce two reflected beams. A first reflected beam 512 is transformed back into a fiberoptic cable by a second variable magnification mirror 513. An off-axis feed 514 drives a network interface 516 and proceeds back along a continuation of the OC-48+ backbone 518.

A split-off beam 520 provides an OC-48 input to a GSR 522 such that any wavelength carried in the DWDM mix on the OC-48+ backbone 502 can be selected and monitored. An IP-address space "A" comparator 524 looks for matches in the individual datapackets transitioning through the OC-48+ backbone 502 that have source and/or destination addresses belonging to a particular range of addresses associated with a particular customer, e.g., an Internet service provider. When a datapacket with source or destination IP-address in IP-address space "A" transitions through system 500, an IP-address space "A" accumulator 526 is incremented. Each increment represents the number of bits carried in a single datapacket, and this times the number counted in a second equals the bandwidth of the carrier system being used by customer "A". In general, the information regarding which exact source or destination IP-addresses were detected can be discarded. Many more such customer usage billing registers can be included, and these are represented in FIG. 5 by a comparator 528 and an accumulator 530, for a space "B" associated with a second customer, and also a comparator 532 and an accumulator 534, for a space "C" associated with a third customer.

In some cases it may be important or necessary to keep a record of "connections". Although the Internet, and more particularly TCP/IP communication, is packet-switched and not circuit-switched, a connection can be recognized packet-by-packet. Each TCP/IP datapacket includes in its header a source IP-address and a destination IP-address. Routers use the destination IP-address to direct a datapacket along its journey across the network. The destination client uses the source IP-address in each datapacket received to organize the information into a whole response to a query.

Oracle Corporation markets a special investigative unit support system (SIUSS) software tool designed to help law enforcement investigators more effectively manage and solve cases. Information management technology such as this can be used to provide insights into criminal activity and reduces the time needed to bring cases to their successful resolution. The Oracle SIUSS collects, stores and analyzes case intelligence information related to complex conspiracies, violent crimes, drug trafficking, and other major cases. The tool combines conventional analytical techniques with job-specific information collection and lead generation analysis. Inputs can be received from various investigative sources, e.g., surveillance teams, forensics experts, wire room operators, citizen tips. The computed conclusions are provided as case leads and made available to agency management, analysts and investigators.

Oracle SIUSS is based on a conventional relational database management system. Criminal patterns are identified by linking subjects, vehicles, locations, businesses and other entities, within a case or among several cases. Information management is provided to users for investigative intelligence, telephone information, assets, financial data, arrests, seizures, credit card data, surveillance, mail covers, trash pickup and incidents. The telephone information can include toll, pen/DNR, and Title III data. Information can be cross-referenced to uncover otherwise obscure and non-obvious relationships.

Database analysis software is now being used by the Federal Bureau of Investigation (FBI), Immigration and Naturalization Service (INS), Department of Justice (DOJ), US Customs, Alcohol Tobacco and Firearms (ATF), state departments of public safety, and many other agencies at all government levels. Case information can be shared or kept separate to any degree desired, depending on the needs of the investigators. Information bits are gathered from the field in hundreds of bits and pieces at different times and places, and submitted to an automated link analysis. Pattern analysis is used to find information in the timing and sequence of phone calls made by an investigation target. Insights can be developed into how the target and his associates work together in a conspiracy. A conspiracy index is created according to the relationships of calls involving the target and others based on their phone numbers. Such relationships are proportional to their mutual involvement in a conspiracy. Secure databases, networking and encryption technologies are used to control the flow and accessibility of intelligence data outside the supplying agency.

Telephone activity analysis involves the identification of illicit operations, and supervisors and their subordinates through telephone profiles. The same can be gleaned from TCP/IP "connection" records. Conventional telephone activity reports display the notes and plant numbers related to each telephone number. If a number occurs in other plant or subject files, which plants and subjects are announced automatically. Financial activity can be combined, sorted and key-word searched for one or more subjects. An account number that appears in another financial plant is also automatically announced. For example, common money laundering methods often display various database indicia. Universal pattern and association searches are conventionally used to combine telephone, surveillance, financial and mail activity, and then to look for any systematic patterns and links. Relational links between a subject, a group, a business, etc., are displayed.

The Institute for Intergovernmental Research (Tallahassee, Fla.), markets a research specialized software for law enforcement agencies under the name CRIMINAL INTELLIGENCE SYSTEM FOR MICROCOMPUTERS (CIS). Law enforcement agencies are able to organize and access information on individual suspects or suspect organizations in an easy to follow format. The CIS program can accept up to seventy-two elements of information on individuals, or forty elements for organizations. CIS groups similar data together for both on-screen viewing and printed reports. Information about individuals is categorized into personal information, alias/moniker, associates, criminal activity, and vehicle information. Organizations are categorized into organization information, criminal activity, and vehicle information. Such organizations can comprise either a business or group suspected of criminal activity. CIS allows access, modifications, additions, and printing of the information. Full or partial descriptions can be entered for most searches, and up to nine elements can be combined to create a personalized search. CIS database records can be transferred between microcomputers, for record sharing within a department or between agencies.

In FIG. 5, such information about TCP/IP "connections" is gathered by a first IP-address comparator 536. When a particular IP-address, either a source or destination, matches "X.X.X.X", then a database 538 is used to record the connection. Since the datapacket as a whole is also available from the GSR 522, so the database 538 may also be used to record the data payload of the datapacket. Such recording would be the TCP/IP equivalent of a wire-tap, and may require a Court Order if the user is a third party to the communication. Similarly, a second IP-address comparator 540 and a database 542 are used to track and log the activity connected with a TCP/IP address, "Y.Y.Y.Y". The activities of "X.X.X.X" and "Y.Y.Y.Y" may be completely unrelated and independent.

The fact of a TCP/IP connection and the frequency of particular TCP/IP connections alone may be useful in detecting the existence of groups, affiliations, associations, enterprises, and even criminal activities when starting with a single IP-address as a seed. Computer analysis would be helpful in detecting such syndication and graphics can be used to present the analysis in a simple and visual Although particular embodiments of the present invention have been described and illustrated, such is not intended to limit the invention. Modifications and changes will no doubt become apparent to those skilled in the art, and it is intended that the invention only be limited by the scope of the appended claims.

What is claimed is:

1. A non-intrusive computer network carrier billing system, comprising:
   a computer data network and backbone having an optical physical layer through which datapackets with source and destination IP-addresses are communicated;

an optical transformation device through which said datapackets on the computer data network and backbone are copied and passed through, and having an output port for a copy of a particular datapacket;

a gigabit switch router (GSR) with an optical dense wavelength division multiplexer (DWDM) input port connected to said output port of the optical transformation device; and a billing processor connected to an output port of the GSR and providing for a compilation of how many datapackets with a particular range of source or destination IP-addresses passed through the optical transformation device;

wherein, said compilation is used for billing a particular customer associated with said particular range of source or destination IP-addresses for usage of the computer data network and backbone.

2. The billing system of claim 1, wherein:

the optical transformation device includes a variable magnification mirror that provides for sampling said datapackets that pass through the computer data network and backbone without first converting such datapackets to electronic signals.

3. The billing system of claim 1, wherein:

the optical transformation device includes a pair of variable magnification mirrors that together provide for sampling said datapackets that pass through the computer data network and backbone without first converting such datapackets to electronic signals, and that further improve a launch of optical network signals back into a fiberoptic cable with a particular numerical aperture.

4. The billing system of claim 1, wherein:

the optical transformation device includes a wedge filter providing for a selection of wavelengths to be passed through to the GSR.

5. The billing system of claim 1, wherein:

the optical transformation device includes a repositionable wedge filter providing for a dynamic selection of wavelengths to be passed through to the GSR.

6. The billing system of claim 1, wherein:

the optical transformation device includes a pair of wedge filters providing for a selection of a range of wavelengths to be passed through to the GSR.

7. The billing system of claim 1, wherein:

the optical transformation device includes a pair of repositionable wedge filters providing for a dynamic selection of a range of wavelengths to be passed through to the GSR.

8. The billing system of claim 1, wherein:

the optical transformation device includes a pair of rotatable wedge filters parallel to one another and having a common axis that provide for a dynamic selection of a range of wavelengths to be passed through to the GSR.

9. The billing system of claim 1, wherein:

the optical transformation device focuses an optical bar-stripe containing said copied datapackets on a wedge filter.

10. The billing system of claim 1, further including:

a comparator connected to the GSR providing for a detection of particular datapackets that include a single IP-address as a source address or a destination address; and a database connected to the comparator for storing "connection" information for each of said particular datapackets that includes both said source and destination IP-addresses.

* * * * *